US008277365B2

(12) United States Patent
Ohbayashi et al.

(10) Patent No.: US 8,277,365 B2
(45) Date of Patent: Oct. 2, 2012

(54) VEHICULAR BRAKING APPARATUS

(75) Inventors: Motonari Ohbayashi, Susono (JP); Kazuya Maki, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 540 days.

(21) Appl. No.: 12/530,911

(22) PCT Filed: Mar. 11, 2008

(86) PCT No.: PCT/JP2008/054408
§ 371 (c)(1),
(2), (4) Date: Sep. 11, 2009

(87) PCT Pub. No.: WO2008/117660
PCT Pub. Date: Oct. 2, 2008

(65) Prior Publication Data
US 2010/0105520 A1    Apr. 29, 2010

(30) Foreign Application Priority Data
Mar. 14, 2007  (JP) ................................. 2007-065553

(51) Int. Cl.
*B60T 8/64*    (2006.01)
*H02P 3/04*    (2006.01)
*H02P 15/00*   (2006.01)
*B60W 10/04*   (2006.01)
*B60W 10/18*   (2012.01)
(52) U.S. Cl. ............ 477/183; 477/25; 477/29; 303/152
(58) Field of Classification Search .............. 477/24–29, 477/183; 303/152; 180/65.1–65.7
See application file for complete search history.

(56) References Cited

U.S. PATENT DOCUMENTS

| 2005/0269875 A1* | 12/2005 | Maki et al. ..................... 303/152 |
| 2007/0222287 A1* | 9/2007 | Crombez et al. .............. 303/151 |

FOREIGN PATENT DOCUMENTS

| DE | 10 2006 055 799 A1 | 5/2008 |
| JP | 9-99820 A | 4/1997 |
| JP | 10-23603 A | 1/1998 |
| JP | 11-98608 A | 4/1999 |
| JP | 2001-234774 A | 8/2001 |
| JP | 2003-074685 A | 3/2003 |
| JP | 2004-052625 A | 2/2004 |
| JP | 2005-145430 A | 6/2005 |
| JP | 2007204004 A * | 8/2007 |

OTHER PUBLICATIONS

Machine translation of JP10023603A, Apr. 5, 2012.*

* cited by examiner

*Primary Examiner* — Tisha Lewis
(74) *Attorney, Agent, or Firm* — Kenyon & Kenyon LLP

(57) ABSTRACT

A vehicular braking apparatus includes an electric motor that generates a wheel driving force or a regenerative wheel braking force and also includes a mechanical wheel braking force generating device, an external braking force generating device, and a braking control device. The mechanical wheel braking force generating device includes a working fluid pressure adjusting unit that generates a mechanical wheel braking force by transmitting the pressure of a working fluid. The external braking force generating device applies an external braking force other than a regenerative vehicle braking force generated by the electric motor and a mechanical vehicle braking force generated by the mechanical wheel braking force generating device, to a vehicle. The braking control device compensates a braking force by an external braking force in order to satisfy a requested vehicle braking force by a driver when the conversion efficiency of the electric motor to electrical energy is decreased.

8 Claims, 6 Drawing Sheets

VEHICULAR BRAKING APPARATUS

This is a 371 national phase application of PCT/JP2008/054408 filed 11 Mar. 2008, claiming priority to Japanese Patent Application No. JP 2007-065553 filed 14 Mar. 2007, the contents of which are incorporated herein by reference.

FIELD OF THE INVENTION

The present invention relates to a vehicular braking apparatus including an electric motor that generates a wheel driving force or a regenerative wheel braking force.

BACKGROUND OF THE INVENTION

Conventionally, various vehicles, which include electric motors as drive sources, have been known. In general, in this kind of a vehicle, a braking apparatus includes a hydraulic wheel braking force generating means (so-called hydraulic brake system) that generates wheel braking forces (hydraulic wheel braking forces) on respective wheels by hydraulic forces and an electric motor that can be operated as a generator in order to generate regenerative wheel braking forces on driving wheels. Usually, in the braking apparatus, the hydraulic wheel braking forces and the regenerative wheel braking forces are adjusted so that a requested vehicle braking force, which corresponds to the driver's operation of a brake pedal, is applied to a vehicle. Accordingly, the hydraulic wheel braking force generating means is provided with a working fluid pressure adjusting unit (so-called brake actuator). The working fluid pressure adjusting unit transmits hydraulic pressure, which is generated by the operating pressure applied to the brake pedal by a driver, to respective wheels as it is, or transmits the hydraulic pressure to the respective wheels after increasing/decreasing the hydraulic pressure.

For example, as the above-mentioned vehicle, there is a hybrid vehicle disclosed in Patent Document 1 that drives front wheels by an engine (prime mover) and drives rear wheels by a motor (electric motor). Further, the following Patent Document 2 discloses a hybrid vehicle that drives one of front and rear wheels by an engine (prime mover) and drives the other thereof by a motor (electric motor).

Meanwhile, the following Patent Document 3 discloses a technique that increases the braking forces of front wheels by applying engine braking to the front wheels in order to avoid rear wheel lock in a vehicle that is driven by an engine. Further, the following Patent Document 4 discloses a technique that controls a gear ratio or a shift point of a transmission means so as to maximize the amount of regenerative power becomes maximum in a range where the sum of a regenerative braking force and an engine braking force does not exceed a predetermined value or a braking force requested by a driver.

Patent Document 1: Japanese Patent Application Laid-open No. 2001-234774
Patent Document 2: Japanese Patent Application Laid-open No. 2004-52625
Patent Document 3: Japanese Patent Application Laid-open No. 2005-145430
Patent Document 4: Japanese Patent Application Laid-open No. 2003-74685

SUMMARY OF INVENTION

Problem to be Solved by the Invention

Meanwhile, the electric motor has characteristics where the maximum value of shaft output torque tends to be decreased when the speed becomes high at a certain point of time. That is, the maximum value of a regenerative braking force, which may be generated by the electric motor, is decreased as shown in FIG. 6 as vehicle speed is increased in a high vehicle speed range that corresponds to the characteristics of the electric motor. Accordingly, in the braking apparatus in the conventional art, in order to generate a requested vehicle braking force even in the high vehicle speed range of the electric motor, hydraulic vehicle braking forces corresponding to the decrease of the regenerative vehicle braking forces should be applied to the vehicle as shown in FIG. 6 by increasing the hydraulic wheel braking forces of all or some of the wheels.

However, the working fluid pressure adjusting unit needs to be operated in order to increase the hydraulic vehicle braking force without increasing the load of the driver (the increase of the pedal stepping force applied to a brake pedal by a driver). In this case, since brake fluid is supplied to the wheels from the hydraulic adjusting units, the brake pedal is lowered by the negative pressure generated on the oil passage that is provided upstream of the working fluid pressure adjusting unit. That is, if the decrease of the regenerative vehicle braking force is compensated by the hydraulic vehicle braking force in the high vehicle speed range, the brake pedal is separated from a driver's feet and lowered although a driver does not increase a pedal stepping force.

Meanwhile, as the vehicle speed is decreased, the maximum value of the regenerative vehicle braking force, which may be generated by the electric motor, is increased in the high vehicle speed range, as shown in FIG. 6. For example, if the amount of residual power in the battery is small in this case, the amount of power stored in the battery should be increased early by generating a regenerative vehicle braking force as large as possible. Accordingly, in this case, it is preferable that the driving of the electric motor be controlled so that the maximum regenerative vehicle braking force is applied.

However, since a braking force larger than the vehicle braking force, which is requested in this case, is applied to a vehicle in the braking apparatus in the conventional art, a hydraulic vehicle braking force is decreased. In this case, since the brake fluid of the wheel returns to the working fluid pressure adjusting unit, the hydraulic pressure of the oil passage provided upstream of the working fluid pressure adjusting unit is increased and pushes out the brake pedal. That is, when the regenerative vehicle braking force is increased while vehicle speed is decreased during the braking in the high vehicle speed range, the brake pedal stepped by the driver is pushed back.

As described above, according to the braking apparatus in the conventional art, the change of the hydraulic vehicle braking force is transmitted to the brake pedal through the oil passage in a predetermined high vehicle speed range, so that the lowering or pushing-back of the brake pedal occurs. Accordingly, the braking apparatus in the conventional art causes the deterioration of the driver's operational feeling of the brake pedal.

An object of the present invention is to provide a vehicular braking apparatus that improves the inconvenience in the conventional art and can prevent the deterioration of the operational feeling of a brake pedal in a vehicle including an electric motor performing regenerative braking.

Means for Solving Problem

In order to solve the above problems, according to one aspect of the present invention, a vehicular braking apparatus including a first wheel braking force generating unit that applies first wheel braking forces generated by regenerative braking to wheels, and a second wheel braking force generating unit that adjusts the pressure of a working fluid that is generated by the operating pressure applied to a brake pedal by a driver and applies second wheel braking forces to the wheels by transmitting the pressure to the respective wheels, the vehicular braking apparatus applying requested wheel braking forces, which correspond to the driver's operation of the brake pedal, to the wheels by the first and second wheel braking forces, the vehicular braking apparatus includes a third wheel braking force generating unit that applies third wheel braking forces other than the first and second wheel braking forces to the wheels; and a braking control unit that compensates braking forces, which correspond to the decrease of the first wheel braking forces, by the third wheel braking forces of the third wheel braking force generating unit, when the first wheel braking forces is decreased due to the deterioration of the conversion efficiency to electrical energy that occurs during the regenerative braking while the first wheel braking forces are applied to the wheels.

The vehicular braking apparatus according to one aspect of the present invention can suppress the change in the pressure of the working fluid when the energy conversion efficiency of the first wheel braking force generating unit is decreased. Accordingly, it is possible to prevent the lowering or pushing-back of the brake pedal from occurring.

Here, according to another aspect of the present invention, the braking control unit is preferably configured to control the second wheel braking force generating unit to maintain constant a braking force which is generated on a vehicle by the second wheel braking forces. Due to this, the vehicular braking apparatus according to another aspect of the present invention can suppress the change in the pressure of the working fluid, thereby enabling to prevent the lowering or pushing-back of the brake pedal from occurring.

Further, according to still another aspect of the present invention, the third wheel braking force generating unit can be formed of at least one of an engine braking control unit that applies engine braking to the wheels, an alternator, and a travel resistance generating unit that generates travel resistance applied to the wheels as braking forces. And, the braking control unit can be configured to generate or increase engine brake torque when the third wheel braking force generating unit is the engine braking control unit, drive the alternator or increases the amount of generated electric power or the amount of charged electric power when the third wheel braking force generating unit is the alternator, and increase travel resistance when the third wheel braking force generating unit is the travel resistance generating unit.

Further, according to still another aspect of the present invention, the braking control unit is preferably configured to control the third wheel braking force generating unit and the first wheel braking force generating unit, decrease a braking force applied to the vehicle by the third wheel braking forces in accordance with the decrease of vehicle speed, and increase the braking force applied to the vehicle by the first wheel braking forces by the third wheel braking forces in accordance with the decreased braking force applied to the vehicle. Due to this, in the vehicular braking apparatus according to still another aspect of the present invention, it is possible to improve the energy recovery efficiency of the first wheel braking force generating unit while satisfying a requested vehicle braking force and preventing the pushing-back of the brake pedal.

Effect of the Invention

Even though the energy conversion efficiency of the first wheel braking force generating means is decreased, the vehicular braking apparatus according to the present invention compensates the braking force, which corresponds to the decrease of the energy conversion efficiency of the first wheel braking force generating means, by a third wheel braking force different from the first or second wheel braking force. Accordingly, the change of the working fluid pressure, which generates the second wheel braking force, is suppressed. Therefore, it is possible to prevent the lowering or pushing-back of the brake pedal from occurring, and to avoid the deterioration of the driver's operational feeling of the brake pedal.

EXPLANATIONS OF LETTERS OR NUMERALS

Figure 1:
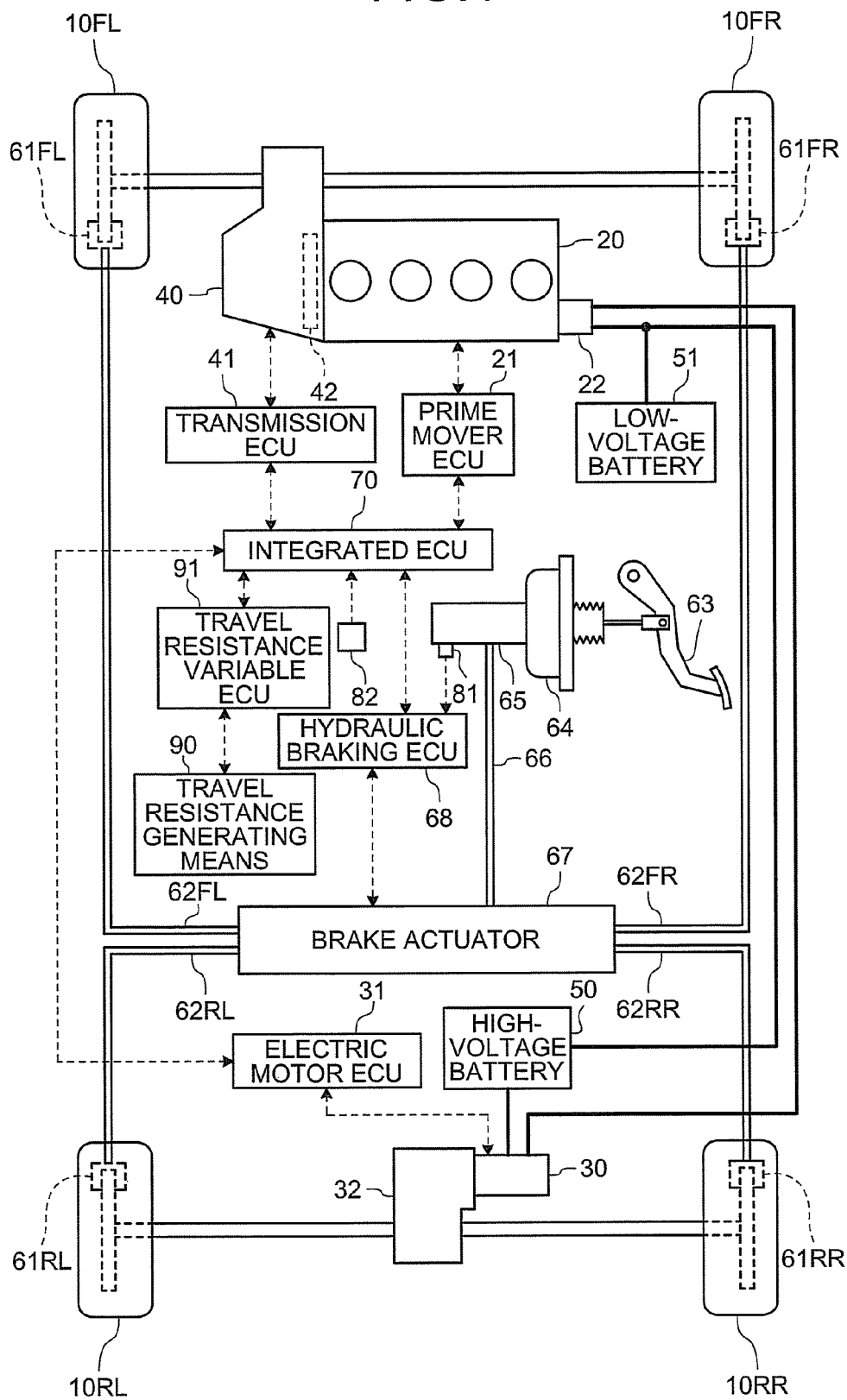
FIG. 1 is a block diagram showing the configuration of a vehicular braking apparatus according to the present invention.

10FL, 10FR, 10RL, 10RR Wheel
20 Prime mover
21 Prime mover ECU
22 Alternator
30 Electric motor
31 Electric motor ECU
40 Transmission
41 Transmission ECU
42 Clutch
61FL, 61FR, 61RL, 61RR Hydraulic braking means
62FL, 62FR, 62RL, 62RR, 66 Hydraulic pipe
63 Brake pedal
64 Brake boosting means
65 Master cylinder
67 Brake actuator
68 Hydraulic pressure control ECU
70 Integrated ECU
81 Pedal stepping force sensor
82 Vehicle speed sensor
90 Travel resistance generating means
91 Travel resistance variable ECU

DETAILED DESCRIPTION

Vehicular braking apparatuses according to embodiments of the present invention will be described in detail below with reference to the drawings. Meanwhile, the present invention is not limited to the embodiments.

First Embodiment

A vehicular braking apparatus according to a first embodiment of the present invention will be described with reference to FIGS. 1 to 4.

Initially, an example of a vehicle, which is an object to which a braking apparatus according to a first embodiment is applied, will be described with reference to FIG. 1. The vehicle shown in FIG. 1 is a so-called hybrid vehicle that drives front wheels 10FL and 10FR by a prime mover 20 such as an internal-combustion engine, and drives rear wheels 10RL and 10RR by an electric motor 30.

First, the hybrid vehicle is provided with an electronic control unit (hereinafter, referred to as a "prime mover ECU") 21 that controls the operation of the prime mover 20. The starting, output, or the like of the prime mover 20 is controlled by the prime mover ECU 21. For example, if the prime mover 20 is an internal-combustion engine that is operated with gasoline fuel, the amount of intake air or injected fuel, ignition timing, and the like of the prime mover 20 are controlled by the prime mover ECU 21, so that the prime mover generates shaft output torque corresponding to a requested value. In the hybrid vehicle, the shaft output torque is transmitted to the front wheels 10FL and 10FR through a transmission (so-called transaxle) 40 that also includes a differential arrangement. The transmission 40 is a unit, such as an automatic transmission regardless of steps or a manual transmission with an automatic shift mode, which can automatically change a gear ratio. The shifting to a gear position or a gear ratio, which corresponds to a requested value, is controlled by an electronic control unit (hereinafter, referred to as a "transmission ECU") 41 that controls the shifting operation.

Meanwhile, in recent years, there has been an integrated unit that is formed by adding the function of the transmission ECU 41 to the prime mover ECU 21. In this case, the shifting of the transmission 40 is controlled by the prime mover ECU 21.

Further, the hybrid vehicle is provided with an electronic control unit (hereinafter, referred to as an "electric motor ECU") 31 that controls the operation of the electric motor 30. The shaft output of the electric motor 30 is controlled by the electric motor ECU 31. In general, since the maximum value of the shaft output, which can be output from the electric motor 30, is set, the electric motor ECU 31 controls the driving of the electric motor 30 so that the shaft output corresponding to a requested value is generated within the maximum value. The electric motor 30 is driven by electric power that is supplied from a high-voltage battery 50 shown in FIG. 1 or electric power that is supplied from an alternator 22 during the power generation. One electric motor 30, which generates a driving force on the respective left and right rear wheels 10RL and 10RR, will be exemplified herein. Accordingly, the vehicle is provided with a power transmission means 32 that decelerates the shaft output torque of the electric motor 30 and transmits the shaft output torque to the respective rear wheels 10RL and 10RR. For example, the power transmission means 32 includes a reduction gear or a differential gear.

Herein, the electric motor (first wheel braking force generating means) 30 of the first embodiment may convert kinetic energy into electrical energy by being operated as a generator, and may generate a regenerative wheel braking force (first wheel braking force) on the rear wheels 10RL and 10RR. That is, herein, the electric motor 30 takes charge of one end of the vehicular braking apparatus. Accordingly, when a braking force needs to be applied to the rear wheels 10RL and 10RR, that is, when braking is requested, the electric motor ECU 31 may apply a regenerative wheel braking force to the rear wheels 10RL and 10RR by operating the electric motor 30 as a generator. The electric power, which is generated in this case, is stored in the high-voltage battery 50. Meanwhile, electric power supplied from the alternator 22 is also stored in the high-voltage battery 50, and the electric power supplied from the alternator 22 is also stored in a low-voltage battery 51 shown in FIG. 1. The electric power of the low-voltage battery 51 is used to drive, for example, a starter of the prime mover 20.

The vehicular braking apparatus includes not only the above-mentioned electric motor 30 that performs regenerative braking, but also a braking force generating means that is mounted on a general vehicle (that is, a mechanical wheel braking force generating means (second wheel braking force generating means) that applies a mechanical wheel braking force (second wheel braking force) to all of the wheels 10FL, 10FR, 10RL, and 10RR. For example, a so-called hydraulic brake, which applies mechanical braking torque to the respective wheels 10FL, 10FR, 10RL, and 10RR by a hydraulic pressure force in order to generate a mechanical wheel braking force, is exemplified as the mechanical wheel braking force generating means of the first embodiment. Accordingly, hereinafter, the mechanical wheel braking force generating means is referred to as a "hydraulic wheel braking force generating means" and a mechanical wheel braking force generated by the hydraulic wheel braking force generating means is referred to as a "hydraulic wheel braking force".

Specifically, the hydraulic wheel braking force generating means, which is exemplified herein, includes hydraulic braking means 61FL, 61FR, 61RL, and 61RR, hydraulic pipes 62FL, 62FR, 62RL, and 62RR, a brake pedal 63, a brake boosting means (brake booster) 64, a master cylinder 65, and a working fluid pressure adjusting unit (hereinafter, referred to as a "brake actuator") 67. The hydraulic wheel braking force generating means include calipers, brake pads, or disk rotors are provided on the respective wheels 10FL, 10FR, 10RL, and 10RR. Hydraulic pressure (that is, brake fluid) is supplied to the calipers of the respective hydraulic braking means 61FL, 61FR, 61RL, and 61RR through the hydraulic pipes, respectively. The brake pedal is operated by a driver. The brake booster redoubles the operating pressure (pedal stepping force) that is input to the brake pedal 63 by the driver. The master cylinder 65 converts the pedal stepping force, which is redoubled by the brake boosting means 64, into fluid pressure (hydraulic pressure) of the brake fluid that is a working fluid. The brake actuator transmits the converted hydraulic pressure of a hydraulic pipe 66 to each of the hydraulic pipes 62FL, 62FR, 62RL, and 62RR as it is, or adjusts the converted hydraulic pressure and then transmits the converted hydraulic pressure to the each of the hydraulic pipes.

The brake actuator 67, which can separately adjust the hydraulic pressure of the respective hydraulic pipes 62FL, 62FR, 62RL, and 62RR, will be exemplified in the first embodiment. That is, the braking apparatus according to the first embodiment may generate hydraulic wheel braking forces, which have independent intensities, on the respective wheels 10FL, 10FR, 10RL, and 10RR. For example, the brake actuator 67 includes various valve units such as pressure increase/decrease control valves for increasing/decreasing the hydraulic pressure of an oil reservoir, an oil pump, and the respective hydraulic pipes 62FL, 62FR, 62RL, and 62RR. Further, the brake actuator performs so-called ABS control or brake assist control by controlling the driving of the valve units and the like with an electronic control unit (hydraulic braking ECU) 68.

In normal times, that is, when ABS control is not performed, the pressure increase/decrease control valves transmit the hydraulic pressure, which corresponds to a requested vehicle braking force by a driver, to the respective hydraulic pipes 62FL, 62FR, 62RL, and 62RR. The requested vehicle braking force is a total braking force for applying vehicle deceleration, which is intended to be obtained by a driver through the operation of the brake pedal 63, to the vehicle. The requested vehicle braking force may be obtained on the basis of the hydraulic pressure of the master cylinder 65, that is, the redoubled pedal stepping force that is detected by a pedal stepping force sensor 81. Meanwhile, the duty ratio of the pressure increase/decrease control valve is controlled by the hydraulic braking ECU 68 as the need arises, like when the ABS control is preformed. Accordingly, hydraulic pressure, which corresponds to the requested vehicle braking force by a driver, slip ratios of the respective wheels 10FL, 10FR, 10RL, and 10RR, or the like, is generated in the respective hydraulic pipes 62FL, 62FR, 62RL, and 62RR.

Herein, the hybrid vehicle according to the first embodiment may be a four-wheel drive vehicle that always applies a driving force to all of the wheels 10FL, 10FR, 10RL, and 10RR (so-called full-time 4WD vehicle). Alternatively, the hybrid vehicle may be a four-wheel drive vehicle that applies a driving force to the only front wheels 10FL and 10FR in normal times and applies a driving force to the rear wheels 10RL and 10RR, if necessary, in accordance with the slip ratio or the like of the front wheels 10FL and 10FR (so-called standby type 4WD vehicle). Meanwhile, the relationship between the front wheels 10FL and 10FR and the rear wheels 10RL and 10RR of the standby type 4WD vehicle may be reversed. Further, the hybrid vehicle stops the prime mover 20 and may be driven only by the electric motor 30 in accordance with the amount of electric power stored in the high-voltage battery 50 or the low-voltage battery 51, the requested driving force, and the like. For this purpose, even in any case, the hybrid vehicle needs to generate an optimum wheel driving force by comprehensively considering a relationship of a driving force between the front wheels 10FL and 10FR and the rear wheels 10RL and 10RR in terms of the behavior stabilization of the vehicle. Further, in order to stabilize the behavior of the vehicle, it is preferable to perform the coordinated control between the shaft output torque of the prime mover 20 and the braking force of each of the wheels 10FL, 10FR, 10RL, and 10RR. Accordingly, the hybrid vehicle of the first embodiment is provided with an electronic control unit (hereinafter, referred to as an "integrated ECU") 70 that performs the coordinated control between the prime mover 20 or the electric motor 30 and the transmission 40 or the hydraulic wheel braking force generating means (brake actuator 67). The integrated ECU 70 transmits and receives control instructions or control requested values, detection signals of various sensors, and the like among the prime mover ECU 21, the electric motor ECU 31, the transmission ECU 41, and the hydraulic braking ECU 68. Further, integrated ECU optimally controls the vehicle driving force or vehicle braking force, and the like. Herein, a braking control means includes the integrated ECU 70, the electric motor ECU 31, and the hydraulic braking ECU 68.

Meanwhile, when the electric motor 30 taking charge of one end of the braking apparatus according to the first embodiment is driven at high speed, the conversion efficiency for converting kinetic energy into electrical energy is decreased due to the characteristics of the electric motor. Accordingly, as vehicle speed is increased, the maximum value (maximum limit value) of a regenerative braking force is decreased in a high vehicle speed range. In this case, a vehicle speed range, until the conversion efficiency for converting kinetic energy into electrical energy is decreased, is referred to as a normal vehicle speed range, and a vehicle speed range where the conversion efficiency for converting kinetic energy into electrical energy is decreased is referred to as a high vehicle speed range. Accordingly, if a requested vehicle braking force by a driver is constant, an actual vehicle braking force relative to the requested vehicle braking force is decreased in the high vehicle speed range as much as vehicle speed is high. For this reason, a vehicle braking force for compensating the difference in the vehicle braking force should be generated from others except for the electric motor 30. Meanwhile, in the first embodiment, the electric motor ECU 31 drives the electric motor 30 at the maximum value of the regenerative braking force during the generation of a regenerative braking force.

In this case, in the hydraulic wheel braking force generating means of the first embodiment, the master cylinder 65 is connected to the calipers of the respective hydraulic braking means 61FL, 61FR, 61RL, and 61RR through the hydraulic pipes 62FL, 62FR, 62RL, 62RR, and 66, and oil passages that are formed in the brake actuator 67. That is, in the hydraulic wheel braking force generating means, hydraulic pressure is increased or decreased by the brake actuator 67. However, the hydraulic pressure, which is applied to the hydraulic pipe 66 from the master cylinder 65, is transmitted to the calipers of the hydraulic braking means 61FL, 61FR, 61RL, and 61RR through the hydraulic pipes 62FL, 62FR, 62RL, and 62RR.

Accordingly, if the pressure-increase control of the hydraulic pipes 62FL, 62FR, 62RL, and 62RR is performed on the brake actuator 67 in order to compensate the difference in the vehicle braking force between the requested vehicle braking force and the actual vehicle braking force, working oil (brake fluid) requested for the pressure increase is supplied to the hydraulic pipes 62FL, 62FR, 62RL, and 62RR, which are objects to be subject to pressure increase, from the hydraulic pipe 66 and the master cylinder 65 that are provided on the upstream side. Therefore, even though a driver maintains the constant pedal stepping force (that is, a pedal stepping amount), the brake pedal 63 is lowered due to the decompression (negative pressure) of the hydraulic pipe 66 or the master cylinder 65.

An external braking force generating means, which applies a braking force (hereinafter, referred to as an "external braking force") other than the regenerative wheel braking force of the electric motor 30 and the hydraulic wheel braking force of the hydraulic wheel braking force generating means to the vehicle, is provided in the first embodiment. While a hydraulic vehicle braking force, which is applied to the vehicle by the hydraulic wheel braking forces of the respective wheels 10FL, 10FR, 10RL, and 10RR, is maintained constant, the deficiency of the vehicle braking force in the high vehicle speed range is compensated by the external braking force generating means. That is, the external braking force generating means applies an external wheel braking force (third wheel braking force), which is different from the regenerative wheel braking force or the hydraulic wheel braking force, to the respective wheels 10FL, 10FR, 10RL, and 10RR by applying the external braking force to the vehicle. The external braking force generating means may be referred to as an external wheel braking force generating means (third wheel braking force generating means). For example, an engine braking control means (the prime mover ECU 21 and the transmission ECU 41), the alternator 22, a travel resistance generating means 90, and the like are considered as the external braking force generating means. At least one of them is used as the external braking force generating means.

If the engine braking control means is used, the integrated ECU 70 gives an instruction to the prime mover ECU 21 or the transmission ECU 41 so as to generate or increase engine brake torque and makes an external braking force (external vehicle braking force) to be applied to the vehicle by the engine brake torque. For example, if a clutch 42 is not connected between the prime mover 20 and the transmission 40, the engine brake torque is generated by connecting the clutch 42. Meanwhile, if the clutch 42 is connected and the engine brake already operates, the engine brake torque is increased by performing the downshift control of the transmission 40. Even in any case, the prime mover 20 is to be stopped if being driven. For example, map data, which uses engine speed, a gear position, or a gear ratio as a parameter, is previously prepared, and the external vehicle braking force in this case may be obtained from the map data.

Further, the alternator 22 is generally connected to a crankshaft of the prime mover 20 through a belt or a pulley (not shown). Accordingly, if being driven, the alternator becomes a load of the prime mover 20. As a result, the engine brake torque is increased. For example, if the alternator 22 is interlocked with only the rotation of the crankshaft, the integrated ECU 70 may give an instruction to the prime mover ECU 21 or the transmission ECU 41 as to generate or increase engine brake torque as described above. Accordingly, the alternator 22 may be used as the external braking force generating means. For example, map data, which uses engine speed as a parameter, is previously prepared, and the external vehicle braking force, which is generated by the alternator 22 in this case, may be obtained from the map data. Further, if the alternator 22 may be driven or stopped independently of the rotation of the crankshaft, the integrated ECU 70 may give an instruction to the prime mover ECU 21 so as to drive the alternator 22 or increase the amount of generated electric power or the amount of charged electric power and increase a load so as to increase the engine brake torque. For example, map data, which uses engine speed or the rotational speed of the alternator 22 as a parameter, is previously prepared, and the external vehicle braking force, which is generated by the alternator 22 in this case, may be obtained from the map data.

Then, an air resistance variable means, which may increase the air resistance of the vehicle, is considered as the travel resistance generating means 90. For example, there are a front bumper including a flap that may be put in or taken out and change in angle by a driving force of an actuator such as a electric motor, a rear wing of which the flap angle may be changed by a driving force of the actuator, and the like. In the case of this kind of the travel resistance generating means 90, the integrated ECU 70 gives an instruction to an electronic control unit (hereinafter, referred to as a "travel resistance variable ECU") 91, which operates the travel resistance generating means 90, so as to increase the air resistance of the vehicle. Further, a force, which is applied to the vehicle due to the increased air resistance, is applied to the vehicle as the external braking force. For example, if the front bumper is used, the flap angle is changed so that the stored flap is taken out or air resistance is increased. If the rear wing is used, the flap angle is changed so that air resistance is increased. For example, map data, which uses vehicle speed and the flap angle as parameters, is previously prepared, and the external vehicle braking force in this case may be obtained from the map data.

Further, a surface resistance variable means, which may increase the surface resistance by increasing grips of the wheels 10FL, 10FR, 10RL, and 10RR on the road surface, is considered as the travel resistance generating means 90. For example, there are a damper of a suspension (so-called air suspension or the like) that may change a damping force by operating an actuator such as an electric motor, a stabilizer that may change a camber angle of the suspension by operating the actuator, and the like. In the case of this kind of the travel resistance generating means 90, the integrated ECU 70 gives an instruction to the travel resistance variable ECU 91 so as to increase the surface resistance. Further, a force, which is applied to the vehicle due to the increased surface resistance, is applied to the vehicle as the external braking force. For example, if the damper is used, the damping force is changed. If the stabilizer is used, the camber angle is changed toward a negative camber side. For example, if the damper is used, map data, which uses the damping force of the damper as a parameter, is previously prepared. If the stabilizer is used, map data, which uses the camber angle as a parameter, is previously prepared. Then, the external vehicle braking force in this case may be obtained from the map data.

Figure 2:
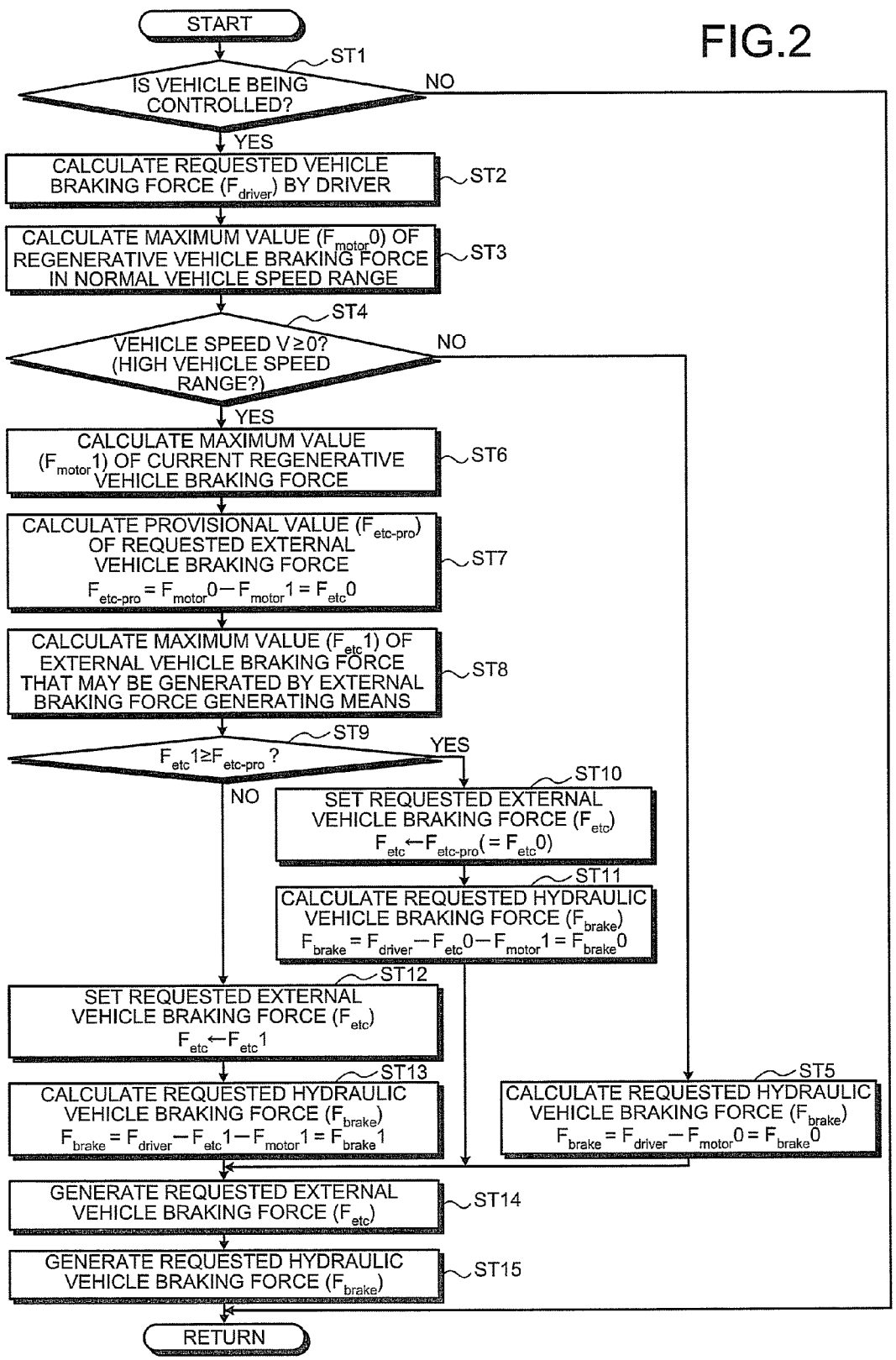
FIG. 2 is a flowchart illustrating the operation of a braking apparatus according to a first embodiment.

An example of the operation of the braking apparatus according to the first embodiment will be described below with reference to the flowchart of FIG. 2.

First, the integrated ECU 70 determines whether the vehicle is being controlled now (Step ST1). The determination can be performed by whether, for example, the detection signal of the pedal stepping force sensor 81 is received.

If the vehicle is being controlled, the integrated ECU 70 calculates a requested vehicle braking force $F_{driver}$ that is requested by a driver, and the maximum value $F_{motor}0$ of the regenerative vehicle braking force in the normal vehicle speed range of the electric motor 30 (Steps ST2 and ST3). In this case, the requested vehicle braking force $F_{driver}$ is set on the basis of the detection value of the pedal stepping force sensor 81 where the braking request of a driver is reflected. Meanwhile, the maximum value $F_{motor}0$ of the regenerative vehicle braking force in the normal vehicle speed range is the sum of the maximum values of the regenerative wheel braking forces that are applied to the respective rear wheels 10RL and 10RR in the normal vehicle speed range by the electric motor 30 of the first embodiment. The maximum value of the regenerative vehicle braking force may be previously set as a characteristic value that depends on the performance of the electric motor 30. Accordingly, if an electric motor (so-called in-wheel motor or the like) is provided in each of the rear wheels 10RL and 10RR unlike the above description, the sum of the maximum values of the regenerative wheel braking forces, which are generated in the normal vehicle speed range by the respective electric motors, may be calculated in Step ST3. Meanwhile, if determining in Step ST1 that the vehicle is not being controlled, the integrated ECU 70 terminates this process and repeats the determination of Step ST1.

Subsequently, the integrated ECU 70 determines whether the current vehicle speed V, which is acquired on the basis of the detection value of a vehicle speed sensor 82, is equal to or higher than a predetermined reference vehicle speed V0 that corresponds to a threshold value (Step ST4). The reference vehicle speed V0 is the minimum vehicle speed where the conversion efficiency of the electric motor 30 for converting kinetic energy into electrical energy is decreased, and means a marginal vehicle speed between the above-mentioned normal and high vehicle speed ranges. That is, in Step ST4, it is determined whether the current vehicle speed V reaches the high vehicle speed range.

Figure 3:
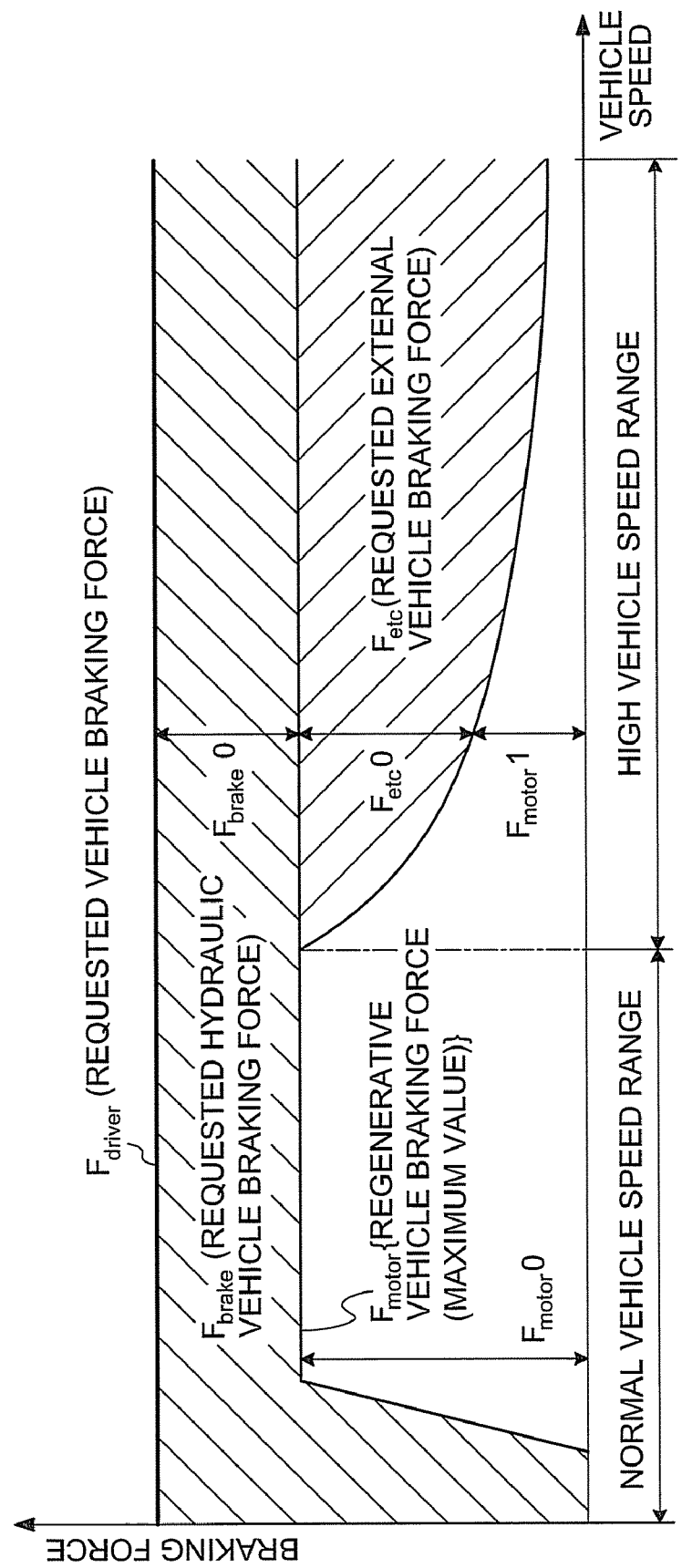
FIG. 3 is a view showing an example of a relationship among a regenerative vehicle braking force, a requested external vehicle braking force, a requested hydraulic vehicle braking force, and a requested vehicle braking force that are requested by a driver and correspond to vehicle speed.

If negative determination is made in Step ST4 and it is determined that the current vehicle speed V is in the normal vehicle speed range of the electric motor 30, the integrated ECU 70 obtains a requested hydraulic vehicle braking force $F_{brake}$ by substituting the requested vehicle braking force $F_{driver}$ and the maximum value $F_{motor}0$ of the regenerative vehicle braking force in the normal vehicle speed range of the electric motor 30 into the following Formula 1 (Step ST5). In this case, as shown in FIG. 3, a requested hydraulic vehicle braking force $F_{brake}0$ is calculated as the deficiency of the requested vehicle braking force $F_{driver}$ when the electric motor 30 is driven so that the maximum value $F_{motor}0$ of the regenerative vehicle braking force in the normal vehicle speed range is applied to the vehicle.

$$F_{brake} = F_{driver} - F_{motor}0 \qquad (1)$$

Meanwhile, if positive determination is made in Step ST4 and it is determined that the current vehicle speed V is in the high vehicle speed range of the electric motor 30, the integrated ECU 70 calculates the maximum value $F_{motor}1$ of the current regenerative vehicle braking force of the electric motor 30 that corresponds to the vehicle speed V in the high vehicle speed range (Step ST6). In this case, for example, a correspondence relationship therebetween is prepared as map data, and the maximum value $F_{motor}1$ of the regenerative vehicle braking force is then obtained by using map data.

Further, the integrated ECU 70 obtains the provisional value $F_{etc-pro}$ of the requested external vehicle braking force by substituting the maximum values $F_{motor}0$ and $F_{motor}1$ of the respective regenerative vehicle braking forces, which correspond to the normal and high vehicle speed ranges, into the following Formula 2 (Step ST7). The requested external vehicle braking force corresponds to a requested value of the external vehicle braking force that is applied to the vehicle by operating at least one of the above-mentioned various external braking force generating means. In this case, a requested external vehicle braking force $F_{etc}0$ shown in FIG. 3, which is a decrease corresponding to the decrease of the energy conversion efficiency of the maximum value $F_{motor}0$ of the regenerative vehicle braking force in the normal vehicle speed range, is calculated.

$$F_{etc-pro} = F_{motor}0 - F_{motor}1 \qquad (2)$$

Further, the integrated ECU 70 of the first embodiment calculates the maximum value $F_{etc}1$ of the external vehicle braking force, which may be generated on the vehicle, by operating all the above-mentioned various external braking force generating means at the same time (Step ST8).

Subsequently, the integrated ECU 70 determines whether the maximum value $F_{etc}1$ of the external vehicle braking force is equal to or larger than the provisional value $F_{etc-pro}$ of the requested external vehicle braking force (Step ST9). That is, herein, it is determined whether the external braking force generating means of the vehicle can apply the provisional value $F_{etc-pro}$ of the requested external vehicle braking force to the vehicle.

If positive determination is made in Step ST9 and it is determined that the provisional value $F_{etc-pro}$ of the requested external vehicle braking force is satisfied with the external braking force generating means of the vehicle, the integrated ECU 70 sets the provisional value $F_{etc-pro}$ ($=F_{etc}0$) as the requested external vehicle braking force Fetc (Step ST10). Then, the requested hydraulic vehicle braking force $F_{brake}$ is obtained by substituting the requested external vehicle braking force $F_{etc}$ ($=F_{etc}0$), the requested vehicle braking force $F_{driver}$ by a driver, and the maximum value $F_{motor}1$ of the current regenerative vehicle braking force in the high vehicle speed range of the electric motor 30 into the following Formula 3 (Step ST11). That is, herein, the requested external vehicle braking force $F_{etc}$ ($=F_{etc}0$), which makes the requested hydraulic vehicle braking force $F_{brake}0$ in the normal vehicle speed range be maintained constant even in the high vehicle speed range, is set as shown in FIG. 3.

$$F_{brake} = F_{driver} - F_{etc}0 - F_{motor}1 \qquad (3)$$

Figure 4:
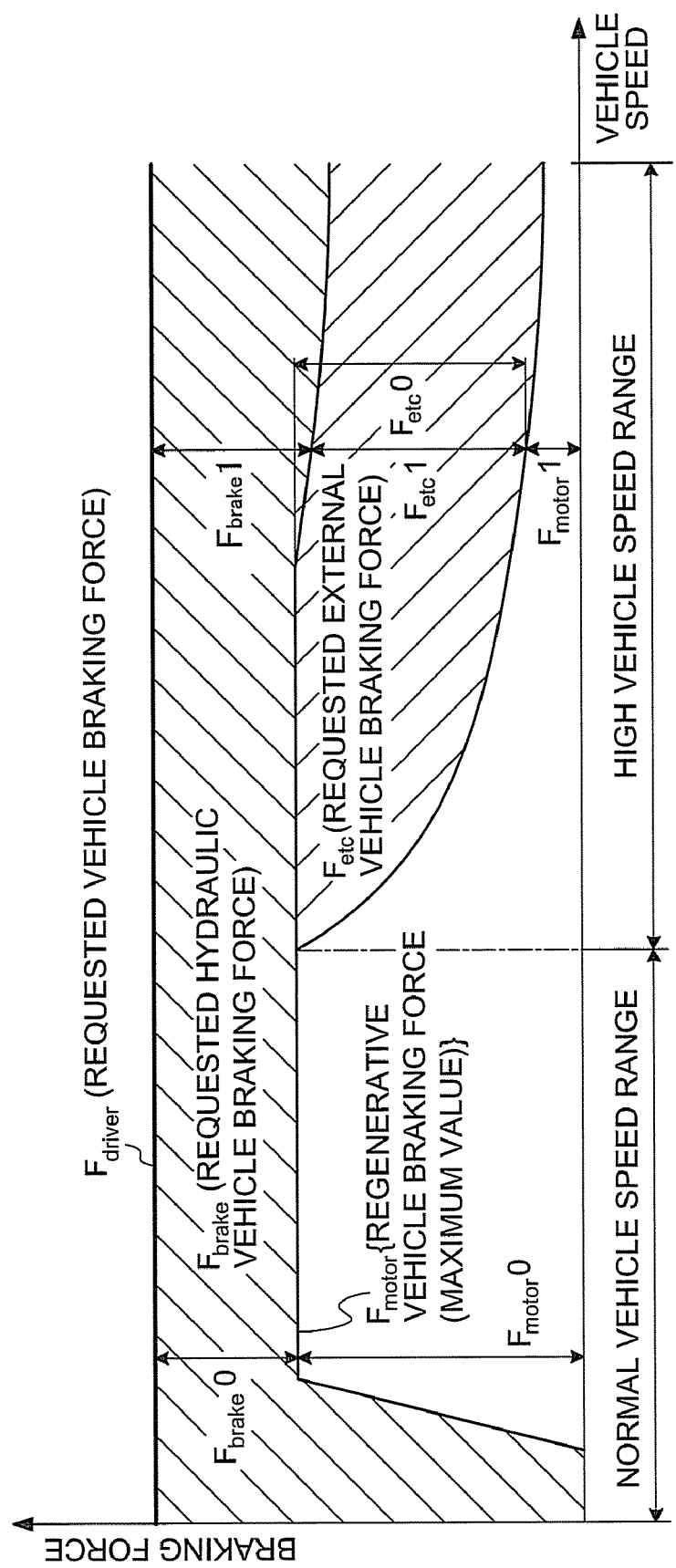
FIG. 4 is a view showing another example of a relationship among a regenerative vehicle braking force, a requested external vehicle braking force, a requested hydraulic vehicle braking force, and a requested vehicle braking force that are requested by a driver and correspond to vehicle speed.

Meanwhile, if negative determination is made in Step ST9 and it is determined that the external braking force generating means of the vehicle cannot generate the provisional value $F_{etc-pro}$ of the requested external vehicle braking force, the integrated ECU 70 sets the maximum value $F_{etc}1$ of the external vehicle braking force, which may be generated by the external braking force generating means, as the requested external vehicle braking force $F_{etc}$ (Step ST12). Then, the requested hydraulic vehicle braking force $F_{brake}$ is obtained by substituting the requested external vehicle braking force $F_{etc}$ ($=F_{etc}1$), the requested vehicle braking force $F_{driver}$ by a driver, and the maximum value $F_{motor}1$ of the current regenerative vehicle braking force in the high vehicle speed range of the electric motor 30 into the following Formula 4 (Step ST13). That is, in this case, as shown in FIG. 4, the maximum regenerative vehicle braking force $F_{motor}1$ and the requested external vehicle braking force $F_{etc}$ ($=F_{etc}1$) are generated by the electric motor 30 and the external braking force generating means, and the requested hydraulic vehicle braking force $F_{brake}$ ($=F_{brake}1$) is set so that the residue of the requested vehicle braking force $F_{driver}$ is generated by the hydraulic wheel braking force generating means.

$$F_{brake} = F_{driver} - F_{etc}1 - F_{motor}1 \qquad (4)$$

The integrated ECU 70 of the first embodiment gives instructions to the travel resistance variable ECU 91 and the hydraulic braking ECU 68 so that the requested external vehicle braking force $F_{etc}$ and the requested hydraulic vehicle braking force $F_{brake}$, which are obtained as described above, are applied to the vehicle (Steps ST14 and ST15).

For example, in the case of the normal vehicle speed range, the hydraulic braking ECU 68 calculates the requested hydraulic wheel braking forces of the respective wheels 10FL, 10FR, 10RL, and 10RR, which may apply the requested hydraulic vehicle braking force $F_{brake}$ ($=F_{brake}0$) of Step ST5 to the vehicle. Then, the hydraulic braking ECU controls the driving of the brake actuator 67 of the hydraulic wheel braking force generating means so that the respective requested hydraulic wheel braking forces are generated. Accordingly, in the case of the normal vehicle speed range, it is possible to generate the requested hydraulic vehicle braking force $F_{brake}$ ($=F_{brake}0$) and the maximum value $F_{motor}0$ of the regenerative vehicle braking force, and to apply the requested vehicle braking force $F_{driver}$ by a driver to the vehicle. Meanwhile, in this case, the respective requested hydraulic wheel braking forces and the requested regenerative wheel braking force are applied to the respective wheels 10FL, 10FR, 10RL, and 10RR. Accordingly, the respective requested wheel braking forces, which correspond to the operation of the brake pedal 63 of a driver, are applied to the wheels. Further, the requested hydraulic vehicle braking force $F_{brake}$ is applied to the vehicle by the requested wheel braking forces that are applied to the respective wheels 10FL, 10FR, 10RL, and 10RR.

In this case, the respective requested hydraulic wheel braking forces may be uniformly distributed to, for example, the respective wheels 10FL, 10FR, 10RL, and 10RR, and larger hydraulic wheel braking forces may be distributed to the front wheels 10FL and 10FR in consideration of the behavior stabilization of the vehicle.

Further, if the requested external vehicle braking force $F_{etc}$ ($=F_{etc}0$) can be generated in the high vehicle speed range by the external braking force generating means of the vehicle, the travel resistance variable ECU 91 obtains the flap angle of the rear wing that may apply the requested external vehicle braking force $F_{etc}$ ($=F_{etc}0$) of Step ST10 to the vehicle, and controls the driving of the external braking force generating means on the basis of the flap angle of the rear wing. Further, in this case, the hydraulic braking ECU 68 calculates the requested hydraulic wheel braking forces of the respective wheels 10FL, 10FR, 10RL, and 10RR that may apply the requested hydraulic vehicle braking force $F_{brake}$ ($=F_{brake}0$) of Step ST11 to the vehicle, and controls the driving of the hydraulic wheel braking force generating means so that the respective requested hydraulic wheel braking forces are generated. Accordingly, in this case, it is possible to generate the requested hydraulic vehicle braking force $F_{brake}$ ($=F_{brake}0$), the maximum value $F_{motor}1$ of the regenerative vehicle braking force, and the requested external vehicle braking force $F_{etc}$ ($=F_{etc}0$), and to apply the requested vehicle braking force $F_{driver}$ by a driver to the vehicle. That is, herein, regardless of the decrease of the energy conversion efficiency of the electric motor 30, the driving of the brake actuator 67 may be controlled so as to correspond to the same requested hydraulic vehicle braking force $F_{brake}$ ($=F_{brake}0$) as the normal vehicle speed range that corresponds to the requested vehicle braking force $F_{driver}$. Accordingly, in this case, the driving of the brake actuator 67 does not need to be controlled any more, and the hydraulic pressure of the oil passages (hydraulic pipe 66 and the like) of the hydraulic wheel braking force generating means is not changed. Therefore, it is possible to accurately prevent the brake pedal 63 from being lowered. Meanwhile, in this case, the respective requested hydraulic wheel braking forces, the requested regenerative wheel braking forces, and the requested external wheel braking forces are applied to the respective wheels 10FL, 10FR, 10RL, and 10RR. Accordingly, the respective requested wheel braking forces, which correspond to the operation of the brake pedal 63 of a driver, are applied to the wheels. Further, the requested hydraulic vehicle braking force $F_{brake}$ is applied to the vehicle by the requested wheel braking forces that are applied to the respective wheels 10FL, 10FR, 10RL, and 10RR.

In this case, the respective requested hydraulic wheel braking forces may be distributed in the same manner as, for example, the case of the normal vehicle speed range. Further, the requested external vehicle braking force $F_{etc}$ ($=F_{etc}0$) in this case may be generated in consideration of the behavior stabilization of the vehicle on both or any one of the front wheels 10FL and 10FR and the rear wheels 10RL and 10RR. For example, if the requested external vehicle braking force $F_{etc}$ ($=F_{etc}0$) is applied to only the front wheels 10FL and 10FR with the emphasis on the behavior stabilization of the vehicle, the driving of the engine brake, the flap angle of the front bumper, and the camber angle or the damping force of the damper of the suspension is controlled in the vehicle. Meanwhile, if the requested external vehicle braking force $F_{etc}$ ($=F_{etc}0$) is applied to only the rear wheels 10RL and 10RR, the driving of the flap angle of the rear wing, and the camber angle or the damping force of the damper of the rear suspension is controlled in the vehicle.

Further, if the requested external vehicle braking force $F_{etc}$ ($=F_{etc}0$) may not be generated in the high vehicle speed range by the external braking force generating means of the vehicle, the travel resistance variable ECU 91 obtains the flap angle of the rear wing that may apply the requested external vehicle braking force $F_{etc}$ ($=F_{etc}1$) of Step ST12, and controls the driving of the external braking force generating means on the basis of the flap angle of the rear wing. Furthermore, in this case, the hydraulic braking ECU 68 calculates the requested hydraulic wheel braking forces of the respective wheels 10FL, 10FR, 10RL, and 10RR that may apply the requested hydraulic vehicle braking force $F_{brake}$ ($=F_{brake}1$) of Step ST13 to the vehicle, and controls the driving of the hydraulic wheel braking force generating means so that the respective requested hydraulic wheel braking forces are generated. Accordingly, in this case, it is possible to generate the requested hydraulic vehicle braking force $F_{brake}$ ($=F_{brake}1$) the maximum value $F_{motor}1$ of the regenerative vehicle braking force, and the requested external vehicle braking force $F_{etc}$ ($=F_{etc}1$), and to apply the requested vehicle braking force $F_{driver}$ by a driver to the vehicle. That is, herein, even though the requested external vehicle braking force $F_{etc}$ ($=F_{etc}(\ )$) is larger than an expected external vehicle braking force, it is possible to compensate the deficiency with respect to the requested vehicle braking force $F_{driver}$ by using the hydraulic vehicle braking force of the hydraulic wheel braking force generating means. Therefore, a driver may not feel the deficiency of the vehicle deceleration.

In this case, the respective requested hydraulic wheel braking forces may also be distributed in the same manner as, for example, the case of the normal vehicle speed range. Further, the requested external vehicle braking force $F_{etc}$ ($=F_{etc}1$) in this case may also be generated as described above on both or any one of the front wheels 10FL and 10FR and the rear wheels 10RL and 10RR.

Meanwhile, since vehicle speed V is decreased when the vehicle begins to be braked, the maximum value $F_{motor}1$ of the regenerative vehicle braking force generated by the electric motor 30 is increased in the high vehicle speed range. In the first embodiment, even in this case, the requested external vehicle braking force $F_{etc}$ ($=F_{etc}1$) where only the increase of the maximum value $F_{motor}1$ of the regenerative vehicle braking force is decreased is set while the requested hydraulic vehicle braking force $F_{brake}$ ($=F_{brake}0$) is maintained constant, so that the requested vehicle braking force $F_{driver}$ by a driver is satisfied. That is, herein, even in this case, the brake actuator 67 does not control the decompression of the hydraulic pipes 62FL, 62FR, 62RL, and 62RR. Accordingly, the working oil (brake fluid) required for decompression does not need to be supplied to the hydraulic pipe 66 or the master cylinder 65 from the hydraulic pipes 62FL, 62FR, 62RL, and 62RR that are provided downstream and are objects to be decompressed. For this reason, the pressure of the hydraulic pipe 66 and the like is not increased herein. Accordingly, it is possible to prevent the pushing-back of the brake pedal 63 that is accompanied with the pressure increase and resists the pedal stepping force of a driver. Further, herein, the regenerative vehicle braking force is increased while the external vehicle braking force is reduced, in order to meet the requested vehicle braking force $F_{driver}$. Accordingly, it is possible to operate the electric motor 30 at the maximum energy recovery efficiency while satisfying the requested vehicle braking force $F_{driver}$ and preventing the pushing-back of the brake pedal 63.

As described above, according to the braking apparatus of the first embodiment, it is possible to prevent the lowering or pushing-back of the brake pedal 63 by suppressing the change of the hydraulic pressure of the oil passage (hydraulic pipe 66 and the like) of the hydraulic wheel braking force generating means to the minimum. Accordingly, it is possible to avoid the deterioration of the driver's operational feeling of the brake pedal 63 while satisfying the requested vehicle braking force $F_{driver}$ and improving the energy recovery efficiency of the electric motor 30.

Second Embodiment

A vehicular braking apparatus according to a second embodiment of the present invention will be described below with reference to FIG. 5.

In general, a regenerative vehicle braking force generated by an electric motor is more excellent than a hydraulic vehicle braking force or an external vehicle braking force of the above-mentioned first embodiment, in terms of the responsiveness until a braking force is actually generated after brake control is commanded. Accordingly, when brake control instructions are given to the hydraulic wheel braking force generating means, the external braking force generating means, and the electric motor 30 at the same time, the hydraulic vehicle braking force or the external vehicle braking force is applied to the vehicle behind the regenerative vehicle braking force.

Accordingly, a control unit is provided in the second embodiment in order to cancel the delay of the responsiveness. A braking apparatus according to the second embodiment is applied to the same hybrid vehicle as the first embodiment, and the structure of the control unit of the second embodiment is the same as that of the control unit of the first embodiment except for the followings.

Specifically, according to the second embodiment, an estimated value of the external vehicle braking force, which is inferior to the regenerative vehicle braking force in terms of responsiveness, is generated at an early stag, and the intensity of the external vehicle braking force is separately adjusted if an excess is generated. Meanwhile, the hydraulic vehicle braking force of the vehicle is generated by the brake pedal 63 that is operated by a driver. Further, if the brake pedal is finely adjusted thereafter, the deterioration of the operational feeling or operability of the brake pedal 63, which is accompanied with the change of the hydraulic pressure, is caused. For this reason, the hydraulic vehicle braking force is not set as an object that is to be controlled by an estimated value.

Figure 5:
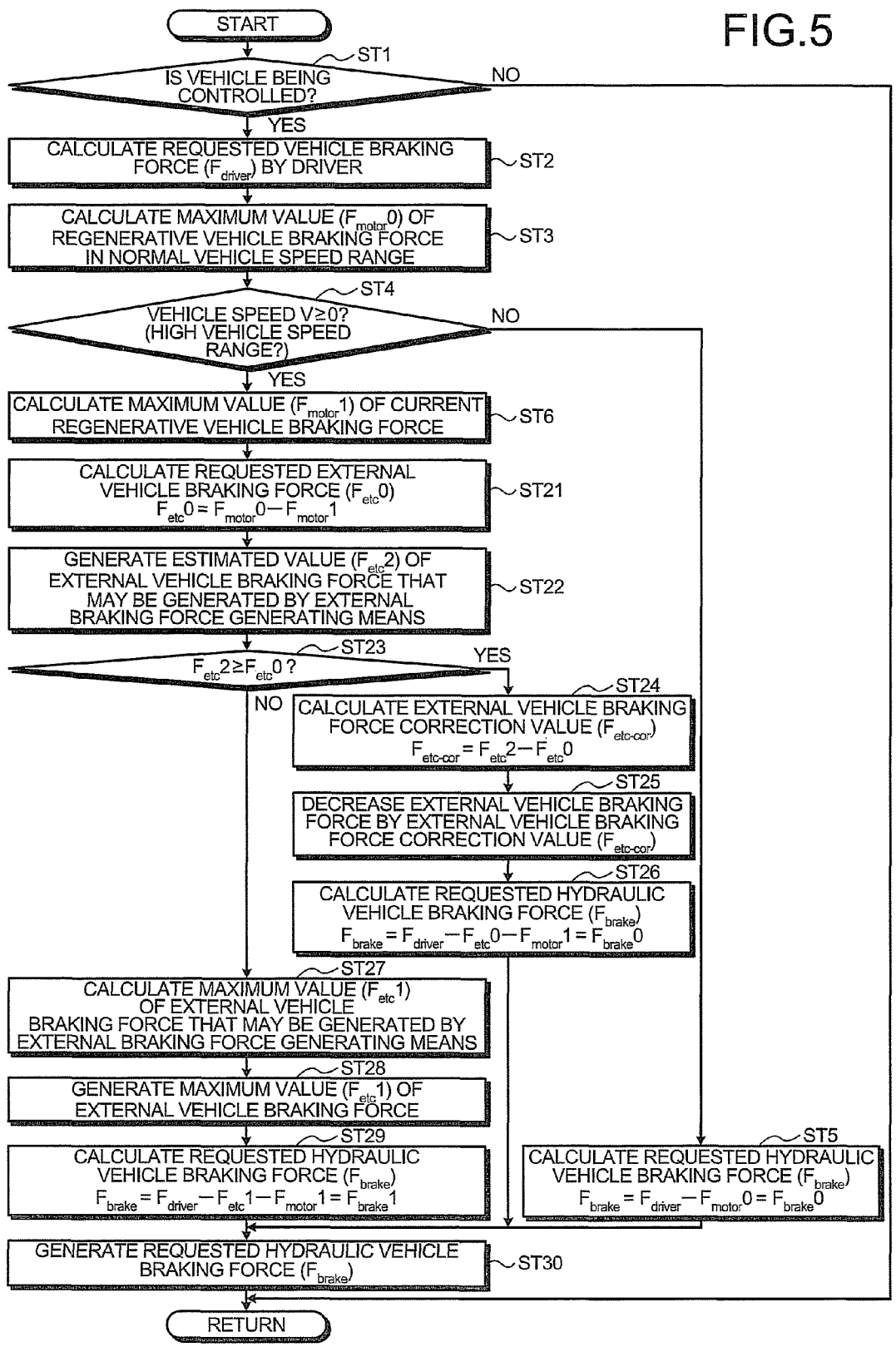
FIG. 5 is a flowchart illustrating the operation of a braking apparatus according to a second embodiment.
Figure 6:
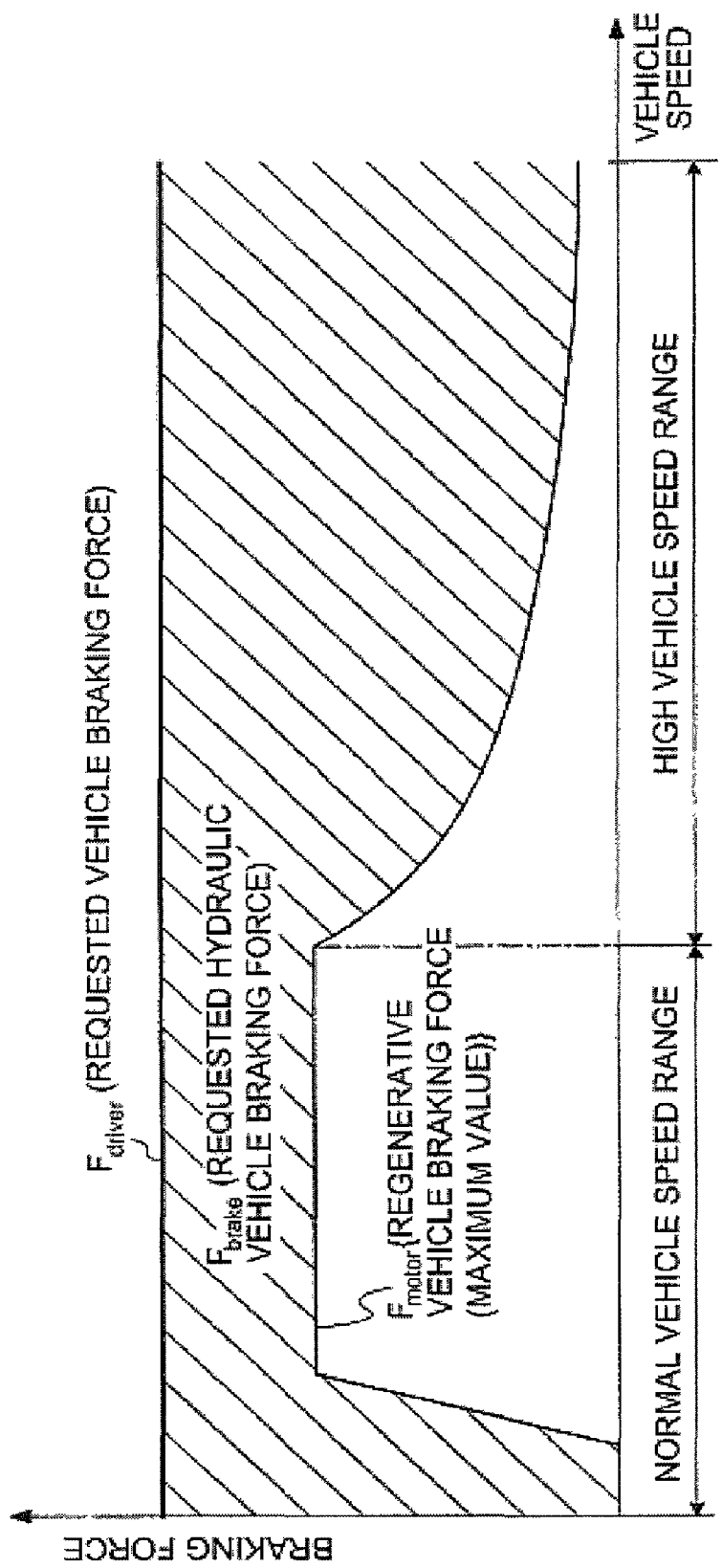
FIG. 6 is a view showing an example of a relationship among a regenerative vehicle braking force, a requested hydraulic vehicle braking force, and a requested vehicle braking force that are requested by a driver and correspond to vehicle speed in the conventional art.

For example, the braking apparatus according to the second embodiment is controlled as shown in the flowchart of FIG. 5. Meanwhile, in the case of the normal vehicle speed range of the electric motor 30, a requested hydraulic vehicle braking force $F_{brake}$ (=$F_{brake}0$) is calculated in the same manner as the first embodiment. For this reason, the operation of Steps ST1 to ST5, which are the same as those in the first embodiment, will be omitted below.

If positive determination is made in Step ST4 and it is determined that the current vehicle speed V is in the high vehicle speed range of the electric motor 30, the integrated ECU 70 of the second embodiment calculates the maximum value $F_{motor}1$ of the current regenerative vehicle braking force of the electric motor 30, which corresponds to the vehicle speed V in the high vehicle speed range, in the same manner as the first embodiment (Step ST6).

Further, the integrated ECU 70 obtains a requested external vehicle braking force $F_{etc}0$ by substituting the maximum values $F_{motor}0$ and $F_{motor}1$ of the respective regenerative vehicle braking forces, which correspond to the normal and high vehicle speed ranges, into the following Formula 5 (Step ST21). Meanwhile, the requested external vehicle braking force $F_{etc}0$ is the same as the provisional value $F_{etc-pro}$ of the requested external vehicle braking force of the first embodiment.

$$F_{etc}0 = F_{motor}0 - F_{motor}1 \qquad (5)$$

Furthermore, the integrated ECU 70 calculates an estimated value $F_{etc}2$ of the external vehicle braking force that is generated by at least one of various external braking force generating means of the vehicle, and gives an instruction to the travel resistance variable ECU 91 so that the estimated value is generated (Step ST22). The estimated value $F_{etc}2$ may be the maximum value $F_{etc}1$ of the external vehicle braking force that is obtained in Step ST8 of the first embodiment, and may be a value that is calculated in accordance with the vehicle speed V or the requested vehicle braking force $F_{driver}$. For example, in the vehicle, it is thought that the amount compensated by the external vehicle braking force is larger if the vehicle speed V is higher and the requested vehicle braking force $F_{driver}$ is larger. Therefore, if the vehicle speed V is higher and the requested vehicle braking force $F_{driver}$ is larger, the estimated value $F_{etc}2$ is set to be larger.

Subsequently, the integrated ECU 70 determines whether the maximum value $F_{etc}2$ of the external vehicle braking force is equal to or larger than the requested external vehicle braking force $F_{etc}0$ (Step ST23). That is, herein, it is determined whether the estimated value $F_{etc}2$ of the external vehicle braking force that may be generated by the external braking force generating means is larger or smaller than the requested external vehicle braking force $F_{etc}0$.

A case where positive determination is made in Step ST23 means a case where it is determined that the estimated value $F_{etc}2$ of the external vehicle braking force is exactly equal to the requested external vehicle braking force $F_{etc}0$ or the estimated value $F_{etc}2$ is larger than the requested external vehicle braking force $F_{etc}0$, and corresponds to a case where the requested external vehicle braking force $F_{etc}0$ is satisfied with the external braking force generating means of the vehicle. For this reason, in this case, the integrated ECU 70 obtains an external vehicle braking force correction value $F_{etc-cor}$ by substituting the estimated value $F_{etc}2$ and the requested external vehicle braking force $F_{etc}0$ into the following Formula 6 (Step ST24), and gives an instruction to the travel resistance variable ECU 91 so that the external vehicle braking force is decreased by the external vehicle braking force correction value (Step ST25). Accordingly, the external braking force generating means of the vehicle applies the requested external vehicle braking force $F_{etc}0$ to the vehicle.

Further, the integrated ECU 70 obtains the requested hydraulic vehicle braking force $F_{brake}$ by substituting the requested external vehicle braking force $F_{etc}0$, the requested vehicle braking force $F_{driver}$ by a driver, and the maximum value $F_{motor}1$ of the current regenerative vehicle braking force in the high vehicle speed range of the electric motor 30 into Formula 3 of the first embodiment (Step ST26). That is, herein, like in Step ST11 of the first embodiment, the same requested hydraulic vehicle braking force $F_{brake}0$ as that in the normal vehicle speed range is set in the high vehicle speed range. If the estimated value $F_{etc}2$ of the external vehicle braking force corresponds to the requested external vehicle braking force $F_{etc}0$, Steps ST24 and ST25 may be omitted and a procedure may proceed to Step ST26.

Meanwhile, a case where negative determination is made in Step ST23 means a case where it is determined that the estimated value $F_{etc}2$ of the external vehicle braking force is smaller than the requested external vehicle braking force $F_{etc}0$, and corresponds to a case where the external braking force generating means of the vehicle cannot generate the requested external vehicle braking force $F_{etc}0$. For this reason, in this case, the integrated ECU 70 obtains the maximum value $F_{etc}1$ of the external vehicle braking force that may be generated by all the external braking force generating means at the same time (Step ST27), and gives an instruction to the travel resistance variable ECU 91 so that the maximum value $F_{etc}1$ is generated (Step ST28). Meanwhile, Steps ST27 and ST28 may be performed only when the estimated value $F_{etc}2$ of the external vehicle braking force obtained in Step ST22 is not equal to the maximum value $F_{etc}1$ of the external vehicle braking force.

Further, the integrated ECU 70 obtains the requested hydraulic vehicle braking force $F_{brake}$ by substituting the maximum value $F_{etc}1$ of the external vehicle braking force, the requested vehicle braking force $F_{driver}$ by a driver, and the maximum value $F_{motor}1$ of the current regenerative vehicle braking force in the high vehicle speed range of the electric motor 30 into Formula 4 of the first embodiment (Step ST29). That is, herein, like in Step ST13 of the first embodiment, the maximum regenerative vehicle braking force $F_{motor}1$ and the external vehicle braking force $F_{etc}1$ are generated by the electric motor 30 and the external braking force generating means, and the requested hydraulic vehicle braking force $F_{brake}$ ($=F_{brake}1$) is set so that the residue of the requested vehicle braking force $F_{driver}$ is generated by the hydraulic wheel braking force generating means.

The integrated ECU 70 of the first embodiment gives an instruction to the hydraulic braking ECU 68 so that so that the requested hydraulic vehicle braking force $F_{brake}$, which is obtained as described above, is applied to the vehicle (Step ST30).

Even in the second embodiment, the requested hydraulic wheel braking force or the requested external vehicle braking force may be distributed to the respective wheels 10FL, 10FR, 10RL, and 10RR in the same manner as the first embodiment.

As described above, according to the braking apparatus of the second embodiment, the same advantage as the first embodiment is obtained and the responsiveness of the external vehicle braking force is improved. Therefore, it is possible to improve the responsiveness of the entire vehicle braking force.

Meanwhile, a hybrid vehicle, which drives the front wheels 10FL and 10FR by the prime mover 20 and drives the rear wheels 10RL and 10RR by the electric motor 30, has been exemplified in the above-mentioned first and second embodiments. However, as long as a vehicle includes an electric motor that applies a regenerative wheel braking force to at least one wheel and a mechanical wheel braking force generating means that applies a mechanical wheel braking force such as a hydraulic wheel braking force, the braking apparatus according to the present invention may be applied to any vehicle. For example, the above-mentioned braking apparatus may be applied to a hybrid vehicle that performs the driving or regenerative braking of front wheels 10FL and 10FR by an electric motor and performs the driving of rear wheels 10RL and 10RR by a prime mover, a hybrid vehicle that performs the driving of both or any one of front wheels 10FL and 10FR and rear wheels 10RL and 10RR by a prime mover and an electric motor and performs the regenerative braking by the electric motor, and the like. Further, the braking apparatus is not limited to the hybrid vehicle, and may be applied to, for example, an electric vehicle that performs the driving or regenerative braking of both or any one of front wheels 10FL and 10FR and rear wheels 10RL and 10RR by an electric motor.

INDUSTRIAL APPLICABILITY

As described above, the vehicular braking apparatus according to the present invention is useful for a technique that prevents the deterioration of the driver's operational feeling of a brake pedal in a vehicle where regenerative braking is performed.

The invention claimed is:

1. A vehicular braking apparatus including a first wheel braking force generating unit that applies first wheel braking forces generated by regenerative braking to wheels, and a second wheel braking force generating unit that adjusts the pressure of a working fluid that is generated by the operating pressure applied to a brake pedal by a driver and applies second wheel braking forces to the wheels by transmitting the pressure to the respective wheels, the vehicular braking apparatus applying requested wheel braking forces, which correspond to the driver's operation of the brake pedal, to the wheels by the first and second wheel braking forces, the vehicular braking apparatus comprising:

an external third braking force generating unit that applies third braking forces other than the first and second wheel braking forces to the wheels; and a braking control unit that compensates braking forces, which correspond to the decrease of the first wheel braking forces, by the third braking forces of the third braking force generating unit, when the first wheel braking forces is decreased due to the deterioration of the conversion efficiency to electrical energy that occurs during the regenerative braking while the first wheel braking forces are applied to the wheels, when the current vehicle speed (V) is equal to or higher than a predetermined reference vehicle speed (V0), whereas the predetermined reference vehicle speed is the minimal vehicle speed where the conversion efficiency of the regenerative braking for converting kinetic energy into electrical energy is decreased.

2. The vehicular braking apparatus according to claim 1, wherein the braking control unit controls the second wheel braking force generating unit to maintain constant a braking force which is generated on a vehicle by the second wheel braking forces.

3. The vehicular braking apparatus according to claim 1, wherein the third braking force generating unit is at least one of an engine braking control unit that applies engine braking to the wheels, an alternator, and a travel resistance generating unit that generates travel resistance applied to the wheels as braking forces, and the braking control unit generates or increases engine brake torque when the third braking force generating unit is the engine braking control unit, drives the alternator or increases the amount of generated electric power or the amount of charged electric power when the third braking force generating unit is the alternator, and increases travel resistance when the third braking force generating unit is the travel resistance generating unit.

4. The vehicular braking apparatus according to claim 1, wherein the braking control unit controls the third braking force generating unit and the first wheel braking force generating unit, decreases a braking force applied to the vehicle by the third braking forces in accordance with the decrease of vehicle speed, and increases the braking force applied to the vehicle by the first wheel braking forces in accordance with the decreased braking force applied to the vehicle by the third braking forces.

5. The vehicular braking apparatus according to 1, wherein the third braking force generating unit is at least one of an engine braking control unit that applies engine braking to the wheels, an alternator, and a travel resistance generating unit that generates travel resistance applied to the wheels as braking forces, and the braking control unit generates or increases engine brake torque when the third braking force generating unit is the engine braking control unit, drives the alternator or increases the amount of generated electric power or the amount of charged electric power when the third braking force generating unit is the alternator, and increases travel resistance when the third braking force generating unit is the travel resistance generating unit.

6. The vehicular braking apparatus according to claim 2, wherein the braking control unit controls the third braking force generating unit and the first wheel braking force generating unit, decreases a braking force applied to the vehicle by the third braking forces in accordance with the decrease of vehicle speed, and increases the braking force applied to the vehicle by the first wheel braking forces by the third braking forces in accordance with the decreased braking force applied to the vehicle.

7. The vehicular braking apparatus according to claim 3, wherein the braking control unit controls the third braking force generating unit and the first wheel braking force generating unit, decreases a braking force applied to the vehicle by the third braking forces in accordance with the decrease of vehicle speed, and increases the braking force applied to the vehicle by the first wheel braking forces in accordance with the decreased braking force applied to the vehicle by the third braking forces.

8. The vehicular braking apparatus according to claim 5, wherein the braking control unit controls the third braking force generating unit and the first wheel braking force generating unit, decreases a braking force applied to the vehicle by the third braking forces in accordance with the decrease of vehicle speed, and increases the braking force applied to the vehicle by the first wheel braking forces in accordance with the decreased braking force applied to the vehicle by the third braking forces.

* * * * *

UNITED STATES PATENT AND TRADEMARK OFFICE
CERTIFICATE OF CORRECTION

PATENT NO. : 8,277,365 B2
APPLICATION NO. : 12/530911
DATED : October 2, 2012
INVENTOR(S) : Motonari Ohbayashi et al.

It is certified that error appears in the above-identified patent and that said Letters Patent is hereby corrected as shown below:

In the Specifications:

Column 9, line 46, change "there are" to --there is--;

Column 10, line 3, change "there are" to --there is--;

Column 14, line 14, change "(=$F_{etc}$ ( )" to --(=$F_{etc}$ 0)--;

Column 15, line 28, change "early stag" to --early stage--;

In the Claims:

Column 18, line 25, change "(V)" to --V--;

Column 18, line 26, change "(V0)" to --VO--.

Signed and Sealed this
Twenty-third Day of April, 2013

Teresa Stanek Rea
*Acting Director of the United States Patent and Trademark Office*